US011127367B2

(12) United States Patent
Miyasaka

(10) Patent No.: US 11,127,367 B2
(45) Date of Patent: Sep. 21, 2021

(54) RELAY DEVICE

(71) Applicant: SOCIONEXT INC., Kanagawa (JP)

(72) Inventor: Shuji Miyasaka, Yokohama (JP)

(73) Assignee: SOCIONEXT INC., Kanagawa (JP)

( * ) Notice: Subject to any disclaimer, the term of this patent is extended or adjusted under 35 U.S.C. 154(b) by 155 days.

(21) Appl. No.: 16/690,382

(22) Filed: Nov. 21, 2019

(65) Prior Publication Data

US 2020/0090624 A1  Mar. 19, 2020

Related U.S. Application Data

(63) Continuation of application No. PCT/JP2018/012067, filed on Mar. 26, 2018.

(30) Foreign Application Priority Data

May 31, 2017 (JP) .............................. JP2017-107794

(51) Int. Cl.
*H04M 3/00* (2006.01)
*G09G 5/00* (2006.01)
(Continued)

(52) U.S. Cl.
CPC ........... *G09G 5/006* (2013.01); *G06F 3/1454* (2013.01); *H04W 4/16* (2013.01); *H04W 88/04* (2013.01);
(Continued)

(58) Field of Classification Search
CPC .............. G09G 5/006; G09G 2354/00; G09G 2370/06; G09G 2370/20; G06F 31/454;
(Continued)

(56) References Cited

U.S. PATENT DOCUMENTS 10,284,812 B1 * 5/2019 Van Os ................ H04N 5/2628
2006/0203758 A1 * 9/2006 Tee ....................... H04W 88/04
370/315
(Continued)

FOREIGN PATENT DOCUMENTS

JP  2007-329691 A  12/2007
JP  2007-329692 A  12/2007
(Continued)

OTHER PUBLICATIONS

International Search Report and Written Opinion dated Jun. 19, 2018 in International Application No. PCT/JP2018/012067; with partial English translation.

*Primary Examiner* — Danh C Le
(74) *Attorney, Agent, or Firm* — McDermott Will and Emery LLP

(57) ABSTRACT

A relay device includes: a case which holds a mobile terminal, the mobile terminal being attachable to and detachable from the case; a first interface to which the mobile terminal held in the case is connected; a second interface with which the external display device is connected; and a controller housed in the case. The controller includes: an obtainer which obtains a video signal and first notification information from the mobile terminal via the first interface; and a superimposer which superimposes second notification information on the video signal based on the first notification information, and outputs the video signal on which the second notification information is superimposed to the external display device via the second interface. The second notification information is obtained by at least one of deletion or replacement of at least a portion of the first notification information.

9 Claims, 12 Drawing Sheets

(51) Int. Cl.
  *G06F 3/14* (2006.01)
  *H04W 4/16* (2009.01)
  *H04W 88/04* (2009.01)
  *H04W 8/24* (2009.01)

(52) U.S. Cl.
  CPC ..... *G09G 2354/00* (2013.01); *G09G 2370/06* (2013.01); *G09G 2370/20* (2013.01); *H04M 2207/18* (2013.01); *H04W 8/245* (2013.01)

(58) Field of Classification Search
  CPC ....... H04W 4/16; H04W 88/04; H04W 8/245; H04M 2207/18
  USPC .................................. 455/419, 550.1, 556.1
  See application file for complete search history.

(56) References Cited

U.S. PATENT DOCUMENTS

| | | | |
|---|---|---|---|
| 2007/0008338 A1* | 1/2007 | Kim | G09G 5/14 345/629 |
| 2007/0135038 A1* | 6/2007 | Peele | H04N 21/4402 455/7 |
| 2010/0100643 A1* | 4/2010 | Shim | H04N 1/00307 710/1 |
| 2011/0179180 A1* | 7/2011 | Schleifer | H04L 12/1818 709/227 |
| 2013/0057762 A1 | 3/2013 | Yoshida et al. | |
| 2016/0035311 A1 | 2/2016 | Ryo | |
| 2016/0309233 A1* | 10/2016 | Liu | H04N 21/4882 |
| 2017/0374338 A1* | 12/2017 | Zheng | H04N 9/8715 |
| 2018/0262055 A1* | 9/2018 | Schoenbart | H01F 38/14 |
| 2018/0270342 A1 | 9/2018 | Hiraki | |
| 2019/0075513 A1* | 3/2019 | Gager | H04W 8/26 |
| 2019/0278467 A1* | 9/2019 | Kim | G07C 5/0816 |
| 2019/0335245 A1* | 10/2019 | Sprenger | H04N 21/4725 |
| 2020/0077141 A1* | 3/2020 | Kim | H04B 1/02 |

FOREIGN PATENT DOCUMENTS

| | | |
|---|---|---|
| JP | 2008-035484 A | 2/2008 |
| JP | 2008-072420 A | 3/2008 |
| JP | 2008-182389 A | 8/2008 |
| JP | 2011-041026 A | 2/2011 |
| JP | 2011-193515 A | 9/2011 |
| JP | 2012-005116 A | 1/2012 |
| WO | 2014/136564 A1 | 9/2014 |
| WO | 2017/085819 A1 | 5/2017 |

* cited by examiner

RELAY DEVICE

CROSS REFERENCE TO RELATED APPLICATIONS

This is a continuation application of PCT International Application No. PCT/JP2018/012067 filed on Mar. 26, 2018, designating the United States of America, which is based on and claims priority of Japanese Patent Application No. 2017-107794 filed on May 31, 2017. The entire disclosures of the above-identified applications, including the specifications, drawings, and claims are incorporated herein by reference in their entirety.

FIELD

The present disclosure relates to a relay device which relays a video signal, and particularly relates to a tabletop relay device which relays a video signal from a mobile terminal to an external display device.

BACKGROUND

There is a demand for watching a content (streaming video, etc.) which is currently displayed on a mobile terminal in high definition on a television (hereinafter, a television is also simply referred to as a "TV") having a large-sized display. For such a demand, various technologies have been conventionally proposed (for example, see Patent Literature (PTL) 1).

PTL 1 discloses the technology for displaying, on an external display device, image data which an application installed on a terminal device outputs when the terminal device is connected to the external display device.

CITATION LIST

Patent Literature

PTL 1: Japanese Unexamined Patent Application Publication No. 2011-41026

SUMMARY

Technical Problem

The mobile terminal may receive, for example, an incoming phone call or a message through a social networking service (SNS) while displaying, on a TV, a video content that is displayed on a mobile terminal display. In such a case, conventional technologies have allowed to display notification information as is on the TV, and personal information (for example, the caller of the incoming phone call or the content of the message received through an SNS) may be seen by viewers.

Consequently, the present disclosure provides a relay device which can prevent personal information included in notification information that is notified to a mobile terminal from being displayed on an external display device when a video content displayed on the mobile terminal is displayed also on a TV.

Solution to Problem

A relay device according to an embodiment of the present disclosure is a relay device that relays a video signal from a mobile terminal to an external display device, the relay device includes: a case which holds the mobile terminal, the mobile terminal being attachable to and detachable from the case; a first interface to which the mobile terminal held in the case is connected, the first interface being provided on the case; a second interface with which the external display device is connected, the second interface being provided on the case; and a controller housed in the case, wherein the controller includes: an obtainer which obtains a video signal and first notification information from the mobile terminal via the first interface; and a superimposer which superimposes second notification information on the video signal based on the first notification information, and outputs the video signal on which the second notification information is superimposed to the external display device via the second interface, the second notification information being obtained by at least one of deletion or replacement of at least a portion of the first notification information.

Note that these comprehensive or specific aspects of the present disclosure may be realized by a system, a method, an integrated circuit, a computer program, or a recording medium such as a computer-readable CD-ROM, or by an optional combination of the system, the method, the integrated circuit, the computer program, and the recording medium.

Advantageous Effects

The present disclosure can prevent personal information included in notification information that is notified to a mobile terminal from being displayed on an external display device when a video content displayed on the mobile terminal is displayed also on a TV.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DESCRIPTION OF EMBODIMENTS

Figure 1:
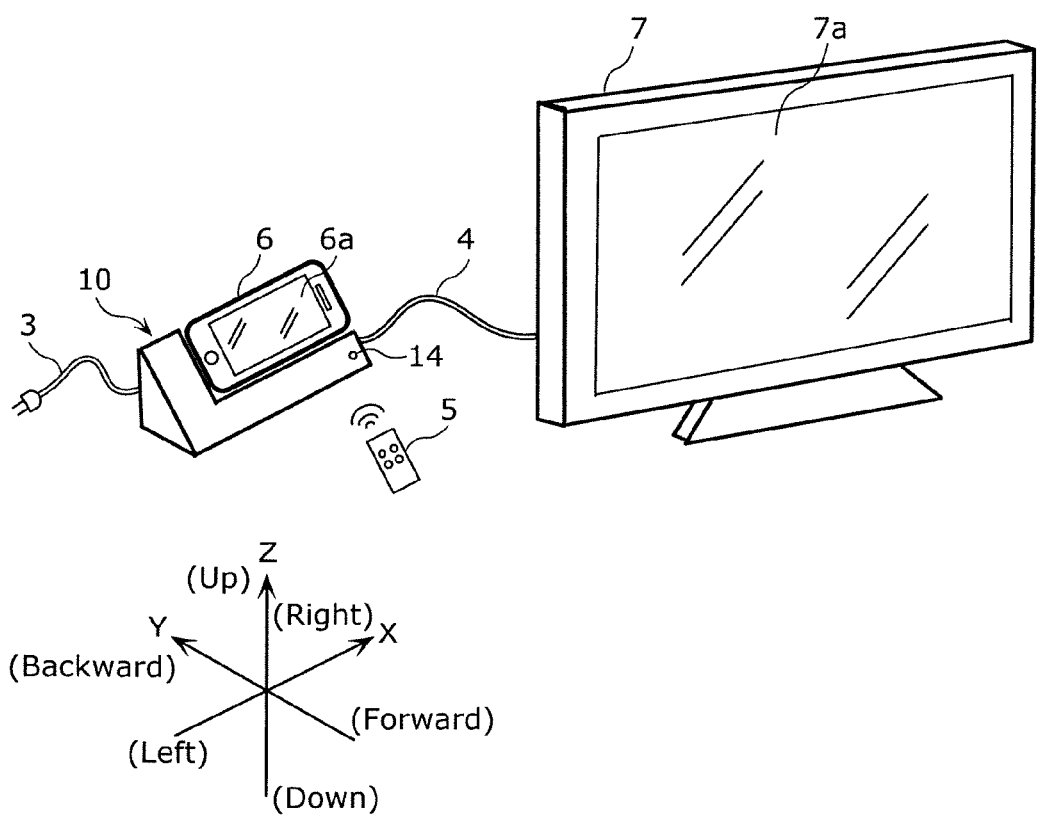
FIG. 1 is a diagram illustrating an example of usage of a relay device according to an embodiment.

Hereinafter, embodiments according to the present disclosure will be described in detail with reference to the drawings. Note that the embodiments described below each show a specific example of the present disclosure. The numerical values, shapes, materials, elements, the arrangement and connection of the elements, procedural steps for usage, procedural steps for communication, etc. which are indicated in the embodiments below are mere examples, and are not intended to limit the present disclosure. Therefore, among the elements in the embodiments below, elements not recited in any of the independent claims defining the most generic part of the inventive concept of the present disclosure are described as optional elements. In addition, the drawings do not necessarily provide strictly accurate illustrations. Throughout the drawings, the same reference numeral is given to substantially the same element, and redundant description may be omitted or simplified.

Embodiment

[Appearance of Relay Device]

First, the appearance of a relay device will be described in detail with reference to FIG. 1, FIG. 2A, and FIG. 2B.

FIG. 1 is a diagram illustrating an example of usage of a relay device 10 according to an embodiment. FIG. 2A and FIG. 2B each are a perspective view of the relay device 10 according to the embodiment. Note that FIG. 1 also illustrates peripheral equipment (a remote controller (remocon) 5, a mobile terminal 6, and a TV 7) relating to the relay device 10.

Figure 2A:
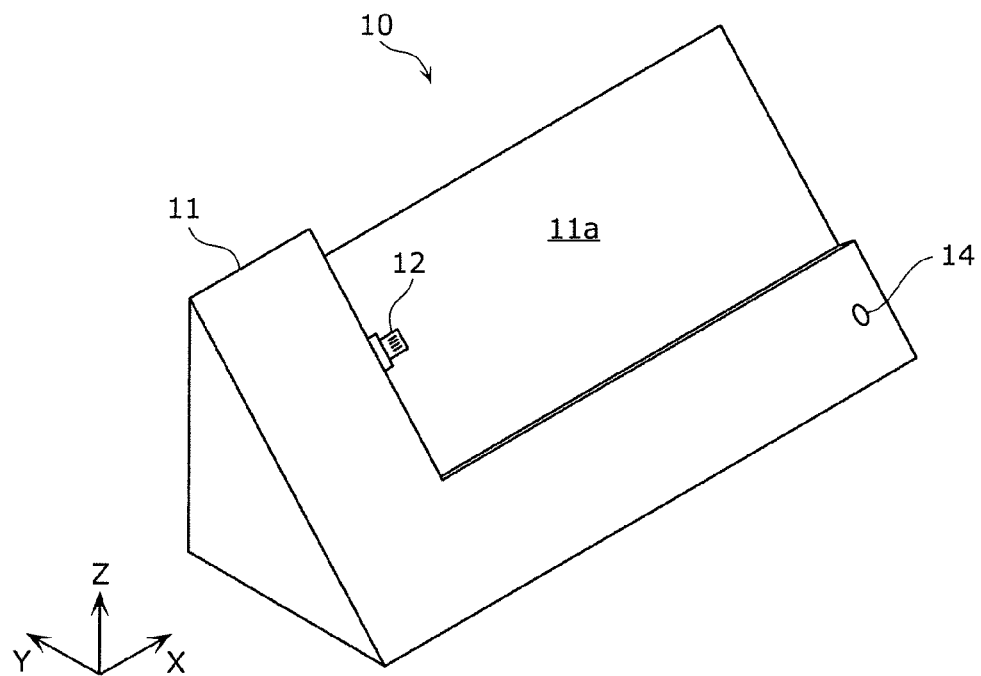
FIG. 2A is a perspective view of the relay device according to the embodiment.
Figure 2B:
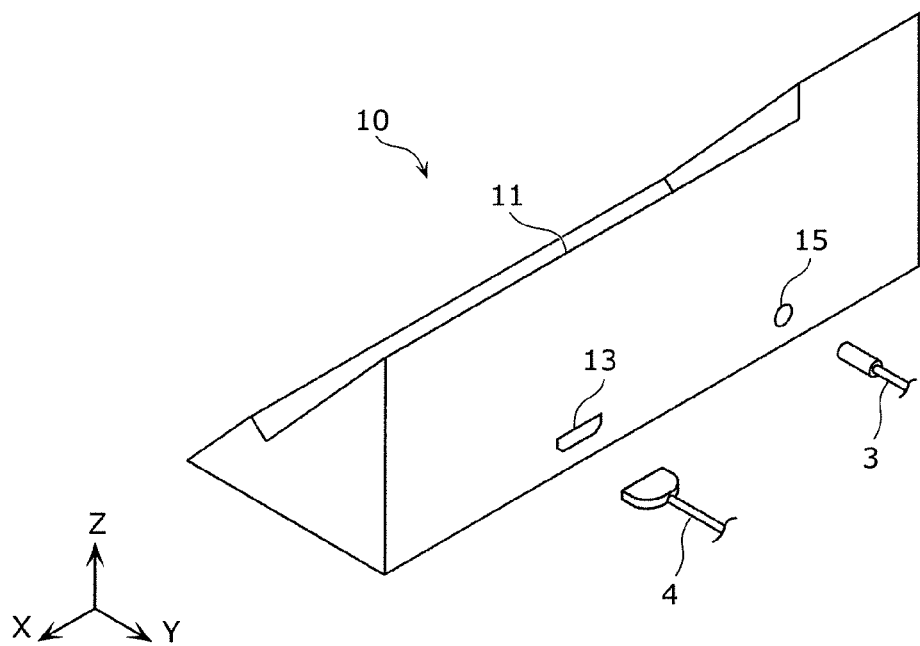
FIG. 2B is a perspective view of the relay device according to the embodiment.

In FIG. 1, FIG. 2A, and FIG. 2B, the X axis is an axis extending in the horizontal direction of a screen 6a of the mobile terminal 6 which is held in the relay device 10. The Z axis is an axis extending in the vertical direction when the relay device 10 is placed on a horizontal plane. The Y axis is an axis orthogonal to the X axis and the Z axis. Note that the positive direction and the negative direction of the X axis will be referred to as right and left, respectively. The positive direction and the negative direction of the Y axis will be referred to as backward and forward, respectively. The positive direction and the negative direction of the Z axis will be referred to as up and down, respectively.

The remocon 5 is a remote control device which wirelessly transmits a command to the relay device 10. For example, the remocon 5 has buttons, and transmits a radio signal (for example, an infrared signal) according to a button pressed. In addition, for example, the remocon 5 may have an acceleration sensor, and may transmit the radio signal according to motion made by shaking the remocon 5 up and down and left and right to cause acceleration.

The mobile terminal 6 is a mobile information terminal having the screen 6a in the shape of a rectangle. The mobile terminal 6 is, for example, a smartphone, a tablet computer, and the like, which is connected to the Internet or a telephone system for communication and for running various applications (software programs). Note that an application may be hereafter written in abbreviated form as an app.

The TV 7 is an example of an external display device which has a screen 7a that displays a video signal output from the relay device 10. The TV 7 is, for example, a 4K TV, an 8K TV, or the like.

The relay device 10 is a tabletop device (the so-called cradle or docking station) which holds the mobile terminal 6. The relay device 10 relays, to the TV 7, the video signal output from the mobile terminal 6 having the screen 6a in the shape of a rectangle.

As illustrated in FIG. 2A and FIG. 2B, the relay device 10 is provided with a case 11, a first interface 12, a second interface 13, a third interface 14, and a power supply terminal 15.

The case 11 has a substantially triangular prism shape. The case 11 has a holder 11a in the front face that corresponds to a face of a triangular prism for holding the mobile terminal 6. The case 11 is formed of, for example, molded resin, and a controller (not illustrated) is housed in the case 11.

The first interface 12 is provided on the case 11, and is directly connected with the mobile terminal 6, not via a cable. Here, the first interface 12 includes a connecting terminal which is directly plugged into a dedicated connector that the mobile terminal 6 has for charging and communication (for example, a lightning connector, a USB, etc.). The relay device 10 supplies, for example, power to the mobile terminal 6 via the first interface 12. In addition, via the first interface 12, the relay device 10 transmits data to the mobile terminal 6, and receives data from the mobile terminal 6, for example.

The second interface 13 is provided on the case 11, and connected with the TV 7. Specifically, the second interface 13 is a communication interface (for example, High-Definition Multimedia Interface (HDMI) (registered trademark)) for transmitting a video signal. Here, the second interface 13 includes a connecting terminal to which a cable 4 is connected.

The third interface 14 is a communication interface which wirelessly receives a command from the remocon 5. For example, the third interface 14 is an infrared communication interface.

The power supply terminal 15 is a female connector into which a power cord 3, such as an AC/DC adapter or an AC power cable, is plugged. The power cord 3 is connected with a commercial power source.

[Functional Configuration of Relay Device]

Figure 3:
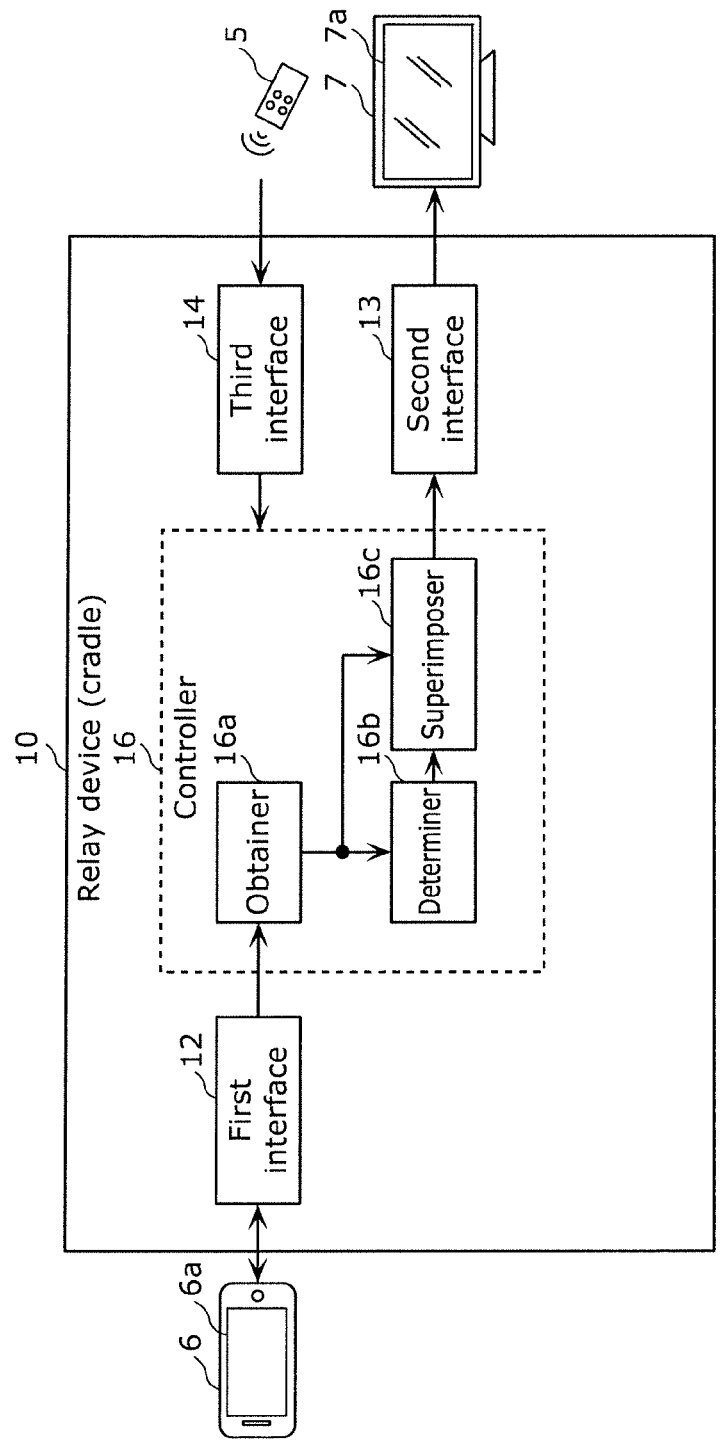
FIG. 3 is a functional block diagram of the relay device according to the embodiment.

Next, the functional configuration of the relay device 10 will be described in detail with reference to FIG. 3 and FIG. 4. FIG. 3 is a functional block diagram of the relay device 10 according to the embodiment.

As illustrated in FIG. 3, the relay device 10 is provided with, as functional elements, the first interface 12, the second interface 13, the third interface 14, and the controller 16.

The first interface 12 is directly connected with the mobile terminal 6 held in the case 11, not via a cable. The relay device 10 receives a video signal from the mobile terminal 6 via the first interface 12. That is to say, the video signal is input to the relay device 10 from the first interface 12.

The second interface 13 is connected with the TV 7. The relay device 10 outputs the video signal to the TV 7 via the second interface 13.

The third interface 14 receives a command that is wirelessly transmitted from the remocon 5. For example, the third interface 14 converts an infrared signal received from the remocon 5 into an electrical signal, and outputs the electrical signal to the controller 16.

The controller 16 is provided with an obtainer 16a, a determiner 16b, and a superimposer 16c. Specifically, the controller 16 is provided with one or more dedicated electric circuits which correspond to the obtainer 16a, the determiner 16b, and the superimposer 16c. In addition, for example, the controller 16 may be provided with, instead of the one or more dedicated electric circuits, a processor (not illustrated), and a memory (not illustrated) in which a software program or an instruction is stored. In this case, the processor functions as the obtainer 16a, the determiner 16b, and the superimposer 16c when the software program or the instruction is executed.

The obtainer 16a obtains the video signal and regular notification information from the mobile terminal 6 via the first interface 12. The regular notification information is an example of first notification information, and is information which an application installed on the mobile terminal 6 notifies. The regular notification information may include personal information about a user of the mobile terminal 6. Specifically, the regular notification information is a notification notified by an SNS app or an e-mail app for receiving an incoming message, or a notification notified by a phone call app for receiving an incoming phone call, for example.

The determiner 16b determines whether the regular notification information includes personal information. The personal information is information about an individual and is information not suitable to be disclosed to a plurality of people. The personal information is, for example, the content of a message which the mobile terminal 6 has received. In addition, the personal information may be, for example, information about a sender of the message which the mobile terminal 6 has received. Furthermore, the personal information may be information about a caller who made a phone call to the mobile terminal 6.

For example, the determiner 16b determines whether the regular notification information includes the personal information by determining whether the regular notification information includes a predetermined keyword. Specifically, when the regular notification information includes the predetermined keyword, the determiner 16b may determine that the regular notification information includes the personal information, or conversely, the determiner 16b may determine that the regular notification information does not include the personal information.

As the keyword, a word input by a user of the mobile terminal 6 via the mobile terminal 6 or the TV 7 may be used, for example. In addition, a word received from a server or the like or a word prestored in a storage (not illustrated) of the relay device 10 can be used as the keyword.

In addition, the determiner 16b may determine whether the regular notification information includes the personal information based on a source application from which the regular notification information is notified. For example, when the source application from which the regular notification information is notified is an SNS application, the determiner 16b may determine that the regular notification information includes the personal information. Note that the information about the source application may be included in the regular notification information, and may be obtained from the mobile terminal 6 separately from the regular notification information.

The superimposer 16c superimposes, based on the regular notification information, simple notification information obtained by deletion and/or replacement of at least a portion of the regular notification information on the video signal, and outputs the video signal to the TV 7 via the second interface 13. The simple notification information is an example of second notification information, and is information simplified from the regular notification information. In other words, the simple notification information has the amount of information that identifies the meaning of the information less than the regular notification information has. For example, while the regular notification information includes the personal information, the personal information is being deleted from the simple notification information. A specific example of the simple notification information will be described later with reference to the drawings.

[Operation Performed by Relay Device]

Next, operation performed by the relay device 10 according to the embodiment, which is configured as described above, will be described in detail with reference to FIG. 4 through FIG. 12.

Figure 4:
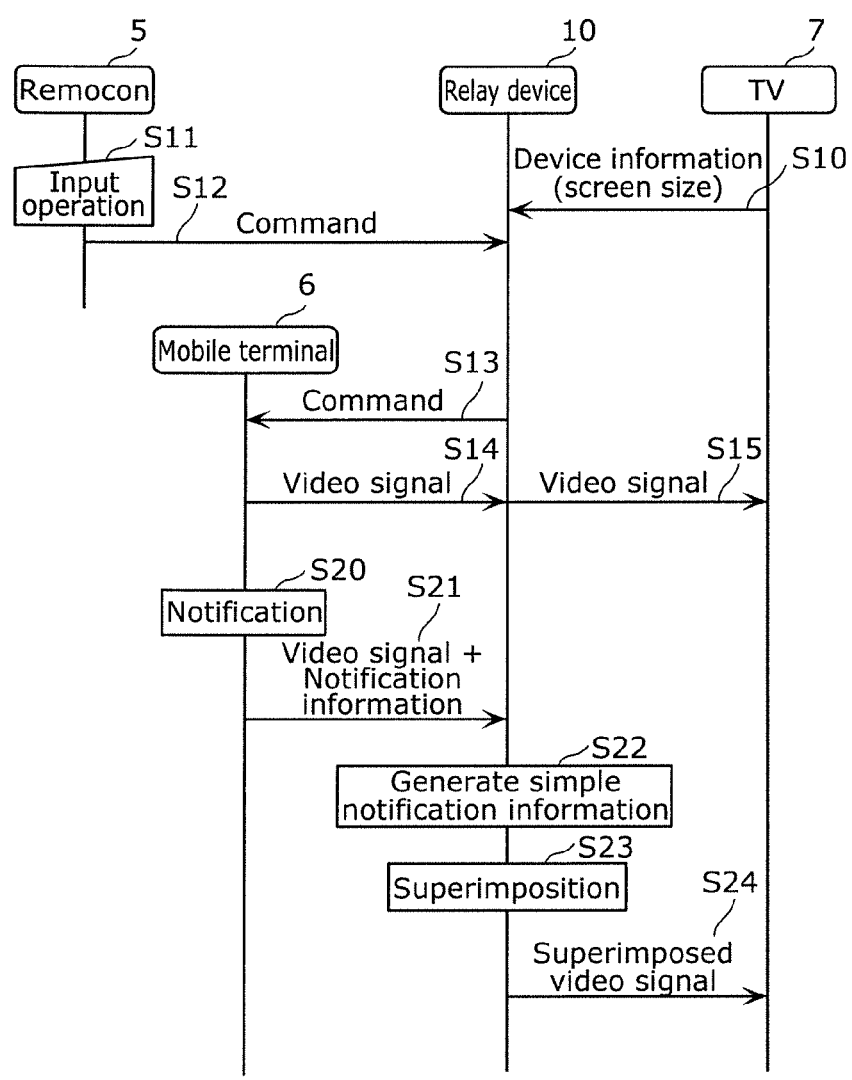
FIG. 4 is a communication sequence diagram illustrating an example of operation performed by the relay device according to the embodiment.

FIG. 4 is a communication sequence diagram illustrating an example of operation performed by the relay device 10 according to the embodiment. Here, the communication sequence diagram illustrates an example of communication among the remocon 5, the mobile terminal 6, the relay device 10, and the TV 7.

First, when the controller 16 of the relay device 10 detects that the second interface 13 is connected with the TV 7 via the cable 4, the controller 16 obtains, from the TV 7, device information including the screen size of the TV 7 via the second interface 13 (S10).

Then, according to operation performed by an operator (S11), the remocon 5 transmits a command using infrared radiation toward the relay device 10 (S12).

The controller 16 of the relay device 10 converts the command which the third interface 14 has received into a command which is readable by the mobile terminal 6, and outputs the converted command to the mobile terminal 6 via the first interface 12 (S13). The command output to the mobile terminal 6 here is a command to operate an application installed on the mobile terminal 6. Specifically, the command is a command to operate video (for example, streaming video etc.). The command to operate video includes, for example, a command to select, play back, fast forward, reverse play back, stop, or pause the video, or an optional combination of the above.

The mobile terminal 6 which has received the command from the relay device 10 outputs a video signal to the relay device 10 according to the command received (S14).

The relay device 10 outputs, to the TV 7, the video signal received from the mobile terminal 6 via the first interface 12 (S15).

The TV 7 reproduces the video signal input, and displays a video content on the screen 7a. This also displays, on the large-sized screen 7a of the TV 7, a content (streaming video, etc.) which is currently displayed on the small-sized screen 6a of the mobile terminal 6. That is to say, both the screen 6a of the mobile terminal 6 and the screen 7a of the TV 7 display a video content of the same content.

Here, the following describes operation in which an application installed on the mobile terminal 6 displays regular notification information on the screen 6a, and outputs the regular notification information to the relay device 10 while the relay device 10 is relaying a video signal from the mobile terminal 6 to the TV 7.

When an application installed on the mobile terminal 6 displays regular notification information on the screen 6a (S20), the obtainer 16a of the relay device 10 obtains, in addition to a video signal, the regular notification information from the mobile terminal 6 via the first interface 12 (S21). The superimposer 16c of the relay device 10 generates simple notification information based on the regular notification information (S22). Then, the superimposer 16c superimposes the simple notification information on the video signal (S23). Accordingly, the video signal on which the simple notification information is superimposed is output to the TV 7 (S24). As a consequence, the simple notification information is displayed on the screen 7a of the TV 7, together with a video content.

Figure 5:
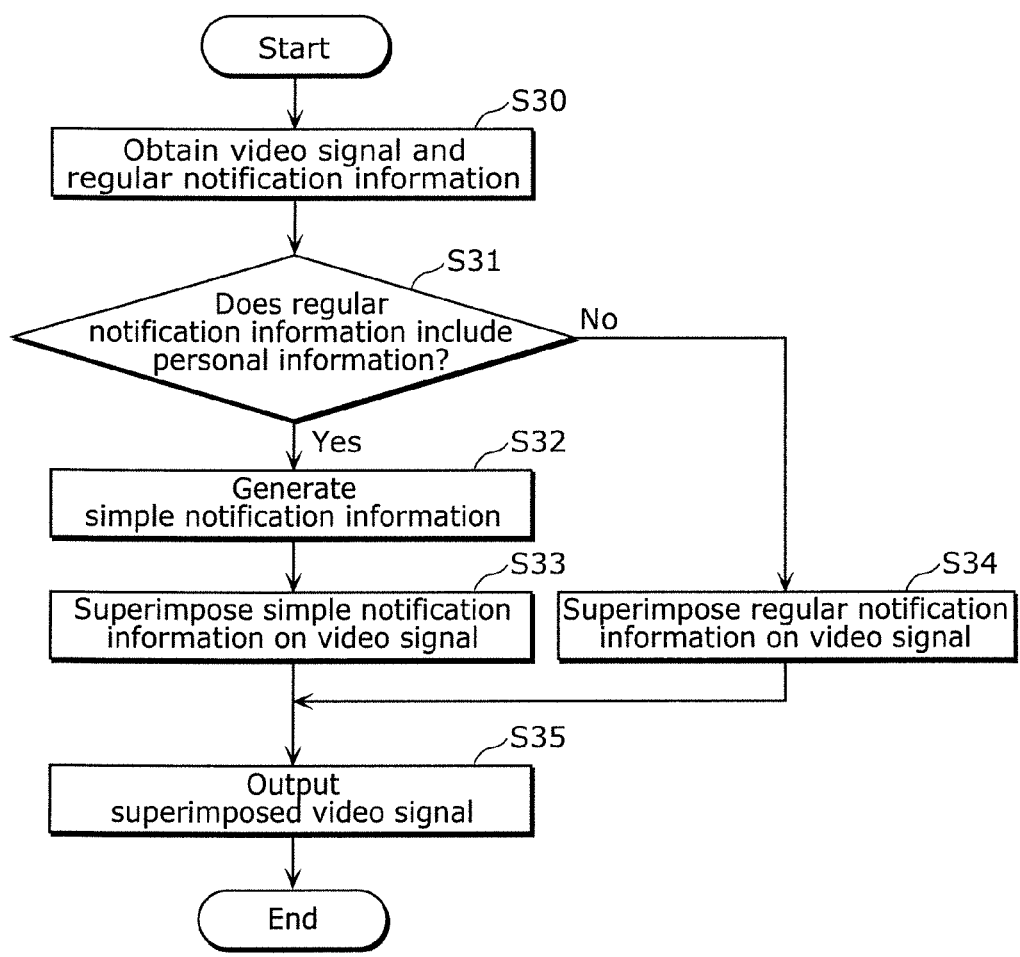
FIG. 5 is a flowchart illustrating an example of operation performed by the relay device according to the embodiment.

Next, operation performed by the relay device 10 as has been described above will be described with reference to a flowchart. FIG. 5 is a flowchart illustrating an example of operation performed by the relay device 10 according to the embodiment. Specifically, FIG. 5 illustrates processing performed by the controller 16 when the relay device 10 obtains regular notification information from the mobile terminal 6.

First, the obtainer 16a obtains a video signal and regular notification information from the mobile terminal 6 via the first interface 12 (S30). The determiner 16b determines whether the regular notification information includes personal information (S31).

Here, when it is determined that the regular notification information includes personal information (Yes in S31), the superimposer 16c generates simple notification information based on the regular notification information (S32). Then, the superimposer 16c superimposes the simple notification information that is generated on the video signal (S33). Specifically, the superimposer 16c superimposes an image indicating the simple notification information onto a predetermined region in a frame that is included in the video signal.

On the other hand, when it is determined that the regular notification information does not include personal information (No in S31), the superimposer 16c superimposes the regular notification information on the video signal (S34). That is to say, the regular notification information is superimposed on the video signal as is.

The superimposer 16c outputs the video signal on which the regular notification information or the simple notification information is superimposed to the TV 7 via the second interface 13 (S35).

As has been described above, the regular notification information will be displayed on the screen 7a of the TV 7 when the regular notification information does not include the personal information, and the simple notification information will be displayed on the screen 7a of the TV 7 when the simple notification information includes the personal information.

[Specific Example of Simple Notification Information]

Next, specific examples of simple notification information will be described with reference to FIG. 6 through FIG. 12.

Figure 6:
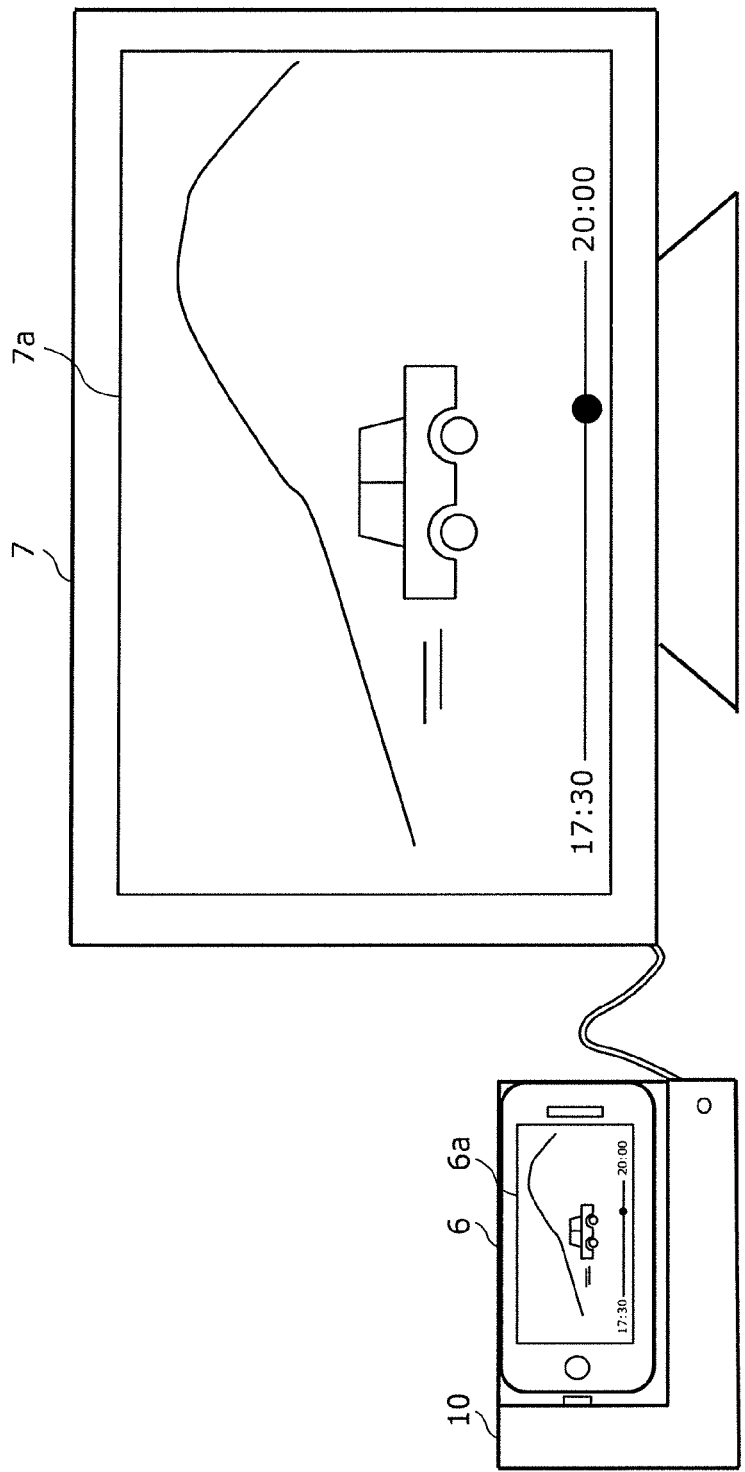
FIG. 6 is a diagram illustrating an example of a video signal according to the embodiment.

FIG. 6 is a diagram illustrating an example of a video signal according to the embodiment. Specifically, FIG. 6 illustrates a video signal displayed as a result of processing from step S11 through step S15 in FIG. 4. As illustrated in FIG. 6, the screen 6a of the mobile terminal 6 and the screen 7a of the TV 7 display a video content of the same content.

Here, the case in which the application installed on the mobile terminal 6 notifies regular notification information, and the screen of the TV 7 displays simple notification information will be described. FIG. 7 through FIG. 12 are diagrams each illustrating an example of simple notification information according to the embodiment.

Figure 7:
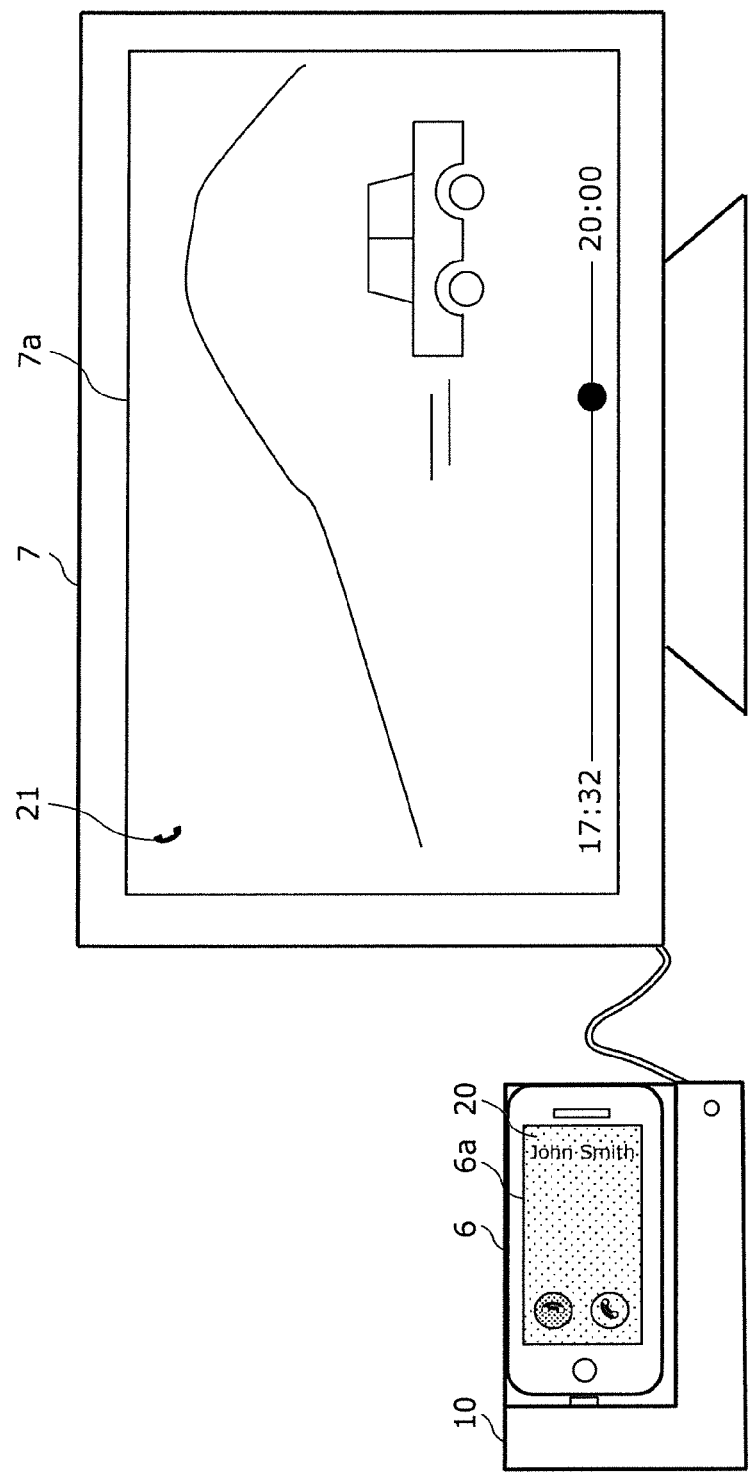
FIG. 7 is a diagram illustrating an example of simple notification information according to the embodiment.

FIG. 7 illustrates the case in which a phone call app installed on the mobile terminal 6 is notifying an incoming phone call, and the screen 6a of the mobile terminal 6 is displaying regular notification information 20 which includes information about the caller, "John Smith", on the entire screen of the screen 6a. At this time, simple notification information 21 includes a mark corresponding to the phone call app which is a source application from which the regular notification information 20 is notified, and does not include information about the caller which is personal information included in the regular notification information 20. That is to say, in the simple notification information 21, the information which indicates the phone call app is replaced by a mark corresponding to the phone call app, and the information about the caller is being deleted. Therefore, although the simple notification information 21 is displayed on the screen 7a of the TV 7, the personal information included in the regular notification information 20 will not be displayed on the screen 7a of the TV 7.

Figure 8:
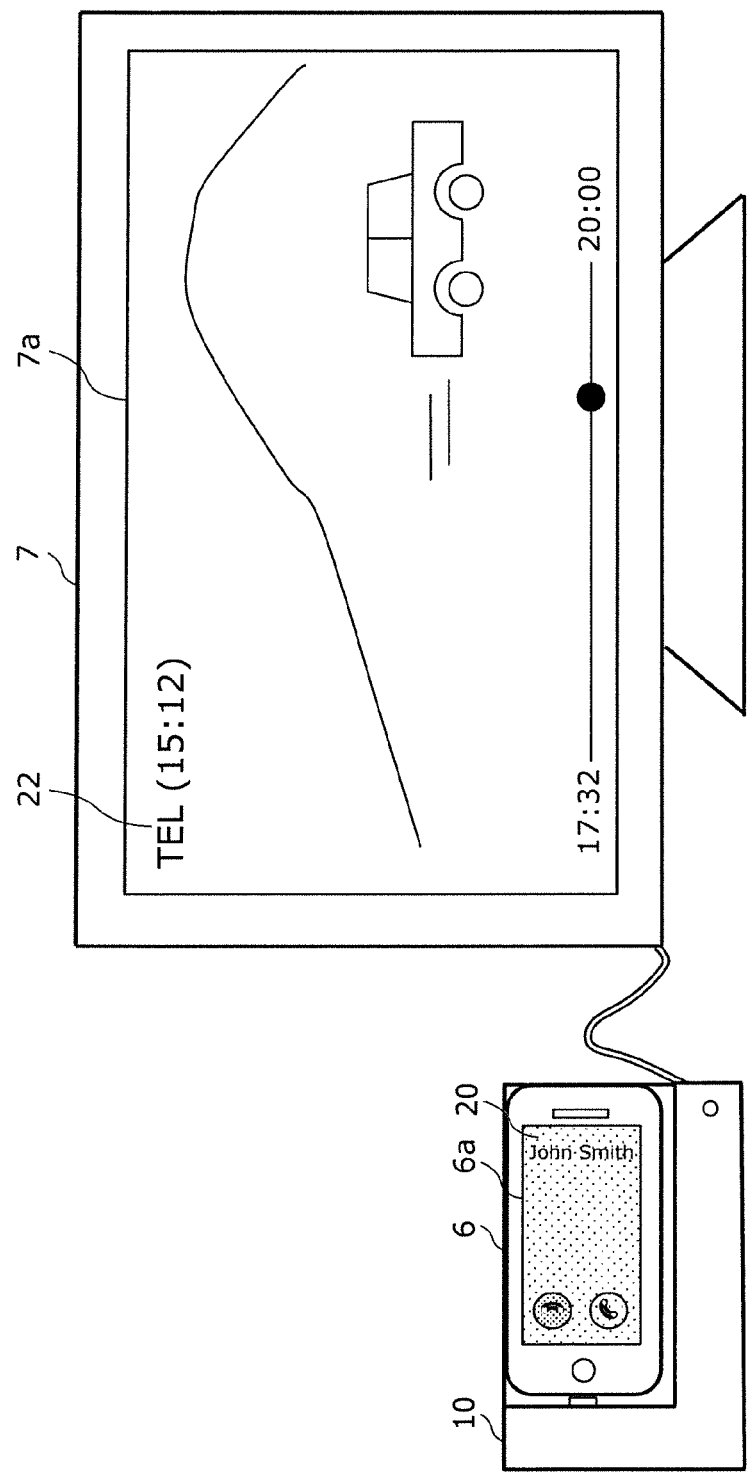
FIG. 8 is a diagram illustrating an example of simple notification information according to the embodiment.

Like FIG. 7, FIG. 8 illustrates the case in which the phone call app installed on the mobile terminal 6 is notifying an incoming phone call, and the screen 6a of the mobile terminal 6 is displaying regular notification information 20 which includes information about a caller on the entire screen of the screen 6a. At this time, simple notification information 22 includes a character string, "TEL", which corresponds to the phone call app, and text information, "15:12", which indicates the time of the incoming phone call, and does not include information about the caller. That is to say, in the simple notification information 22, the information which indicates the phone call app is replaced by the character string, "TEL", the information indicating the time of the incoming phone call, "15:12", is included as is, and the information about the caller is being deleted. Therefore, although the simple notification information 22 is displayed on the screen 7a of the TV 7, the personal information included in the regular notification information 20 will not be displayed on the screen 7a of the TV 7.

Figure 9:
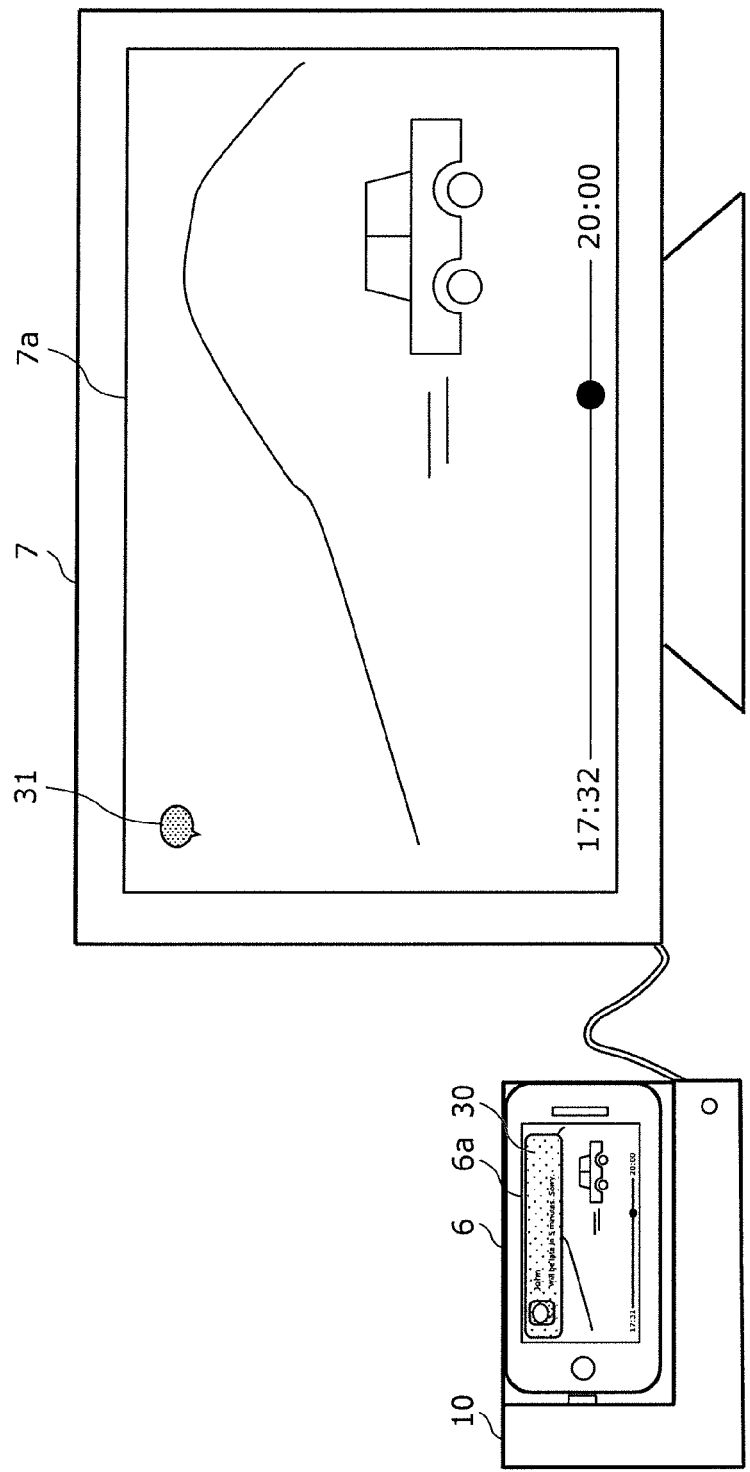
FIG. 9 is a diagram illustrating an example of simple notification information according to the embodiment.

FIG. 9 illustrates the case in which an SNS app installed on the mobile terminal 6 is notifying an incoming message, and the screen 6a of the mobile terminal 6 is displaying, in the upper part of the screen 6a, regular notification information 30 which includes the content of the incoming message and the information about a sender of the incoming message. At this time, the simple notification information 31 includes a mark corresponding to the SNS app which is a source application from which the regular notification information 30 is notified, and does not include the content of the message included in the regular notification information 30. That is to say, in the simple notification information 31, the information indicating the SNS app is replaced by a mark corresponding to the SNS app, and information, such as the information about the sender and the content of the incoming message, is being deleted. Therefore, although the simple notification information 31 is displayed on the screen 7a of the TV 7, the personal information included in the regular notification information 30 will not be displayed on the screen 7a of the TV 7.

Figure 10:
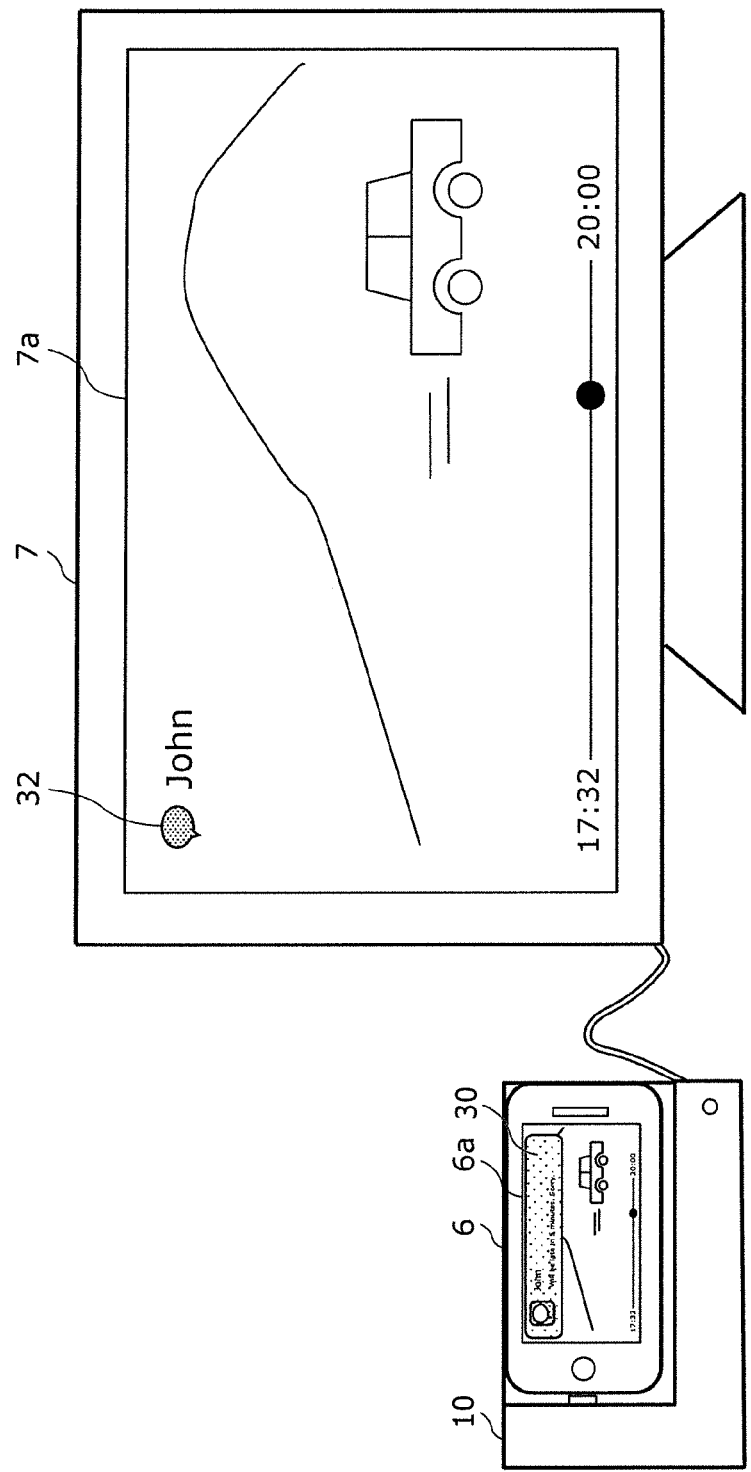
FIG. 10 is a diagram illustrating an example of simple notification information according to the embodiment.

Like FIG. 9, FIG. 10 illustrates the case in which an SNS app installed on the mobile terminal 6 is notifying an incoming message, and the screen 6a of the mobile terminal 6 is displaying, in the upper part of the screen 6a, regular notification information 30 which includes the content of the incoming message and the information about a sender of the incoming message. At this time, simple notification information 32 includes information about the sender, and does not include the content of the incoming message. That is to say, in the simple notification information 32, the information which indicates the SNS app is replaced by a mark corresponding to the SNS app, the information about the sender is included as is, and information, such as the content of the incoming message, is being deleted. Therefore, although the simple notification information 32 is displayed on the screen 7a of the TV 7, the personal information other than the information about the sender which is included in the regular notification information 30 will not be displayed on the screen 7a of the TV 7.

Figure 11:
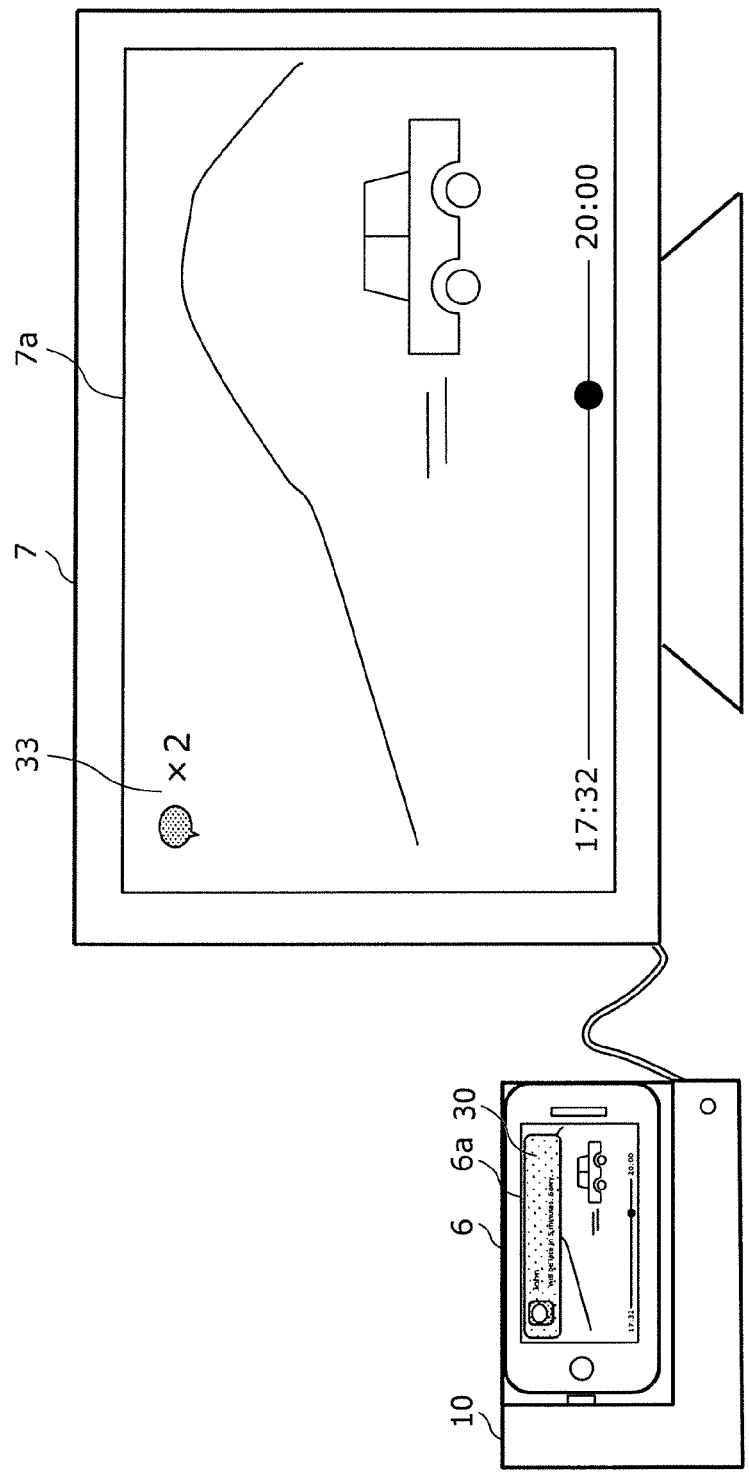
FIG. 11 is a diagram illustrating an example of simple notification information according to the embodiment.

FIG. 11 illustrates the case in which an SNS app installed on the mobile terminal 6 is notifying two incoming messages, and the screen 6a of the mobile terminal 6 is displaying, in the upper part of the screen 6a, regular notification information 30 which includes the content of one of the two incoming messages and the information about a sender of one of the two incoming messages. At this time, simple notification information 33 includes a mark corresponding to the SNS app and the number of incoming messages received, and does not include the content of the incoming messages. Therefore, although the simple notification information 33 is displayed on the screen 7a of the TV 7, the personal information included in the regular notification information 30 will not be displayed on the screen 7a of the TV 7.

Figure 12:
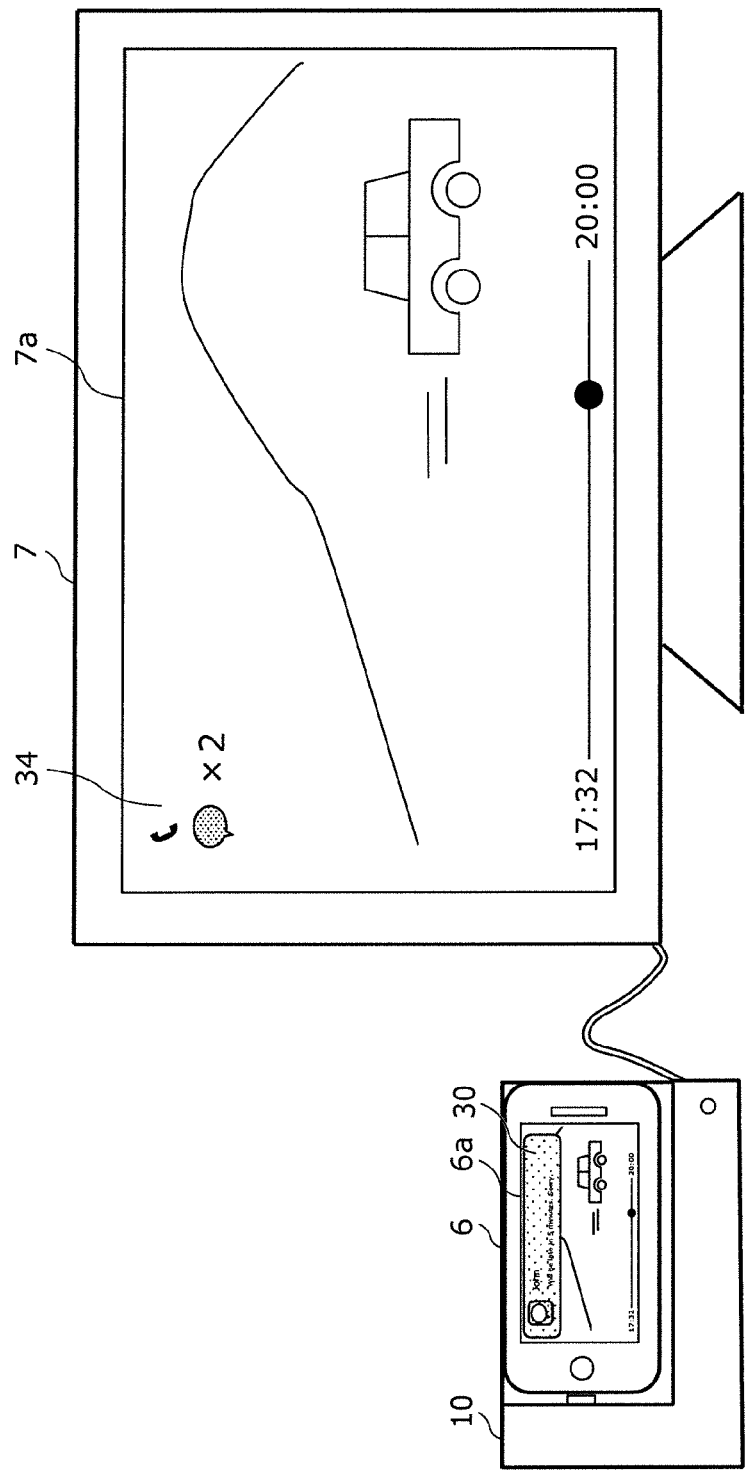
FIG. 12 is a diagram illustrating an example of simple notification information according to the embodiment.

FIG. 12 illustrates the case in which a phone call app installed on the mobile terminal 6 is notifying an incoming phone call, and an SNS app installed on the mobile terminal 6 is notifying two incoming messages. And, the screen 6a of the mobile terminal 6 is displaying, in the upper part of the screen 6a, regular notification information 30 which includes the content of one of the two incoming messages and the information about a sender of one of the two incoming messages. At this time, simple notification information 34 includes a mark corresponding to the SNS app, and the number of incoming messages received. This simple notification information 34 is equivalent to the combination of the simple notification information 21 in FIG. 7 and the simple notification information 33 in FIG. 11. Therefore, like FIG. 7 and FIG. 11, the personal information included in the regular notification information 30 will not be displayed on the screen 7a of the TV 7, although the simple notification information 34 is displayed on the screen 7a of the TV 7.

[Effects, etc.]

As has been described above, the relay device 10 according to the embodiment is a device that relays a video signal from the mobile terminal 6 to the TV 7. The relay device 10 includes: the case 11 which holds the mobile terminal 6 that is attachable to and detachable from the case 11; the first interface 12 which is provided on the case 11, and to which the mobile terminal 6 held in the case 11 is connected; the second interface 13 which is provided on the case 11, and with which the TV 7 is connected; and the controller 16 housed in the case 11. The controller 16 includes: the obtainer 16a which obtains a video signal and regular notification information (first notification information) from the mobile terminal 6 via the first interface 12; and the superimposer 16c which superimposes simple notification information (second notification information), which is obtained by at least one of deletion or replacement of at least a portion of the regular information, on the video signal based on the regular notification information, and outputs the video signal on which the simple notification information is superimposed to the TV 7 via the second interface 13.

Accordingly, the relay device 10 includes the case 11 that holds the mobile terminal 6, and thus the mobile terminal 6 is connected with the TV 7 in the state of being held in the case 11. Therefore, a user need not detach the mobile terminal 6 from the relay device 10 to hold the mobile terminal 6 by hand when operating the mobile terminal 6. In addition, although the screen 6a of the mobile terminal 6 displays the regular notification information while the screen 7a of the TV 7a is displaying a video content, the relay device 10 can prevent personal information included in the regular notification information from being displayed on the screen 7a of the TV 7, since the simple notification information which is obtained by deletion and/or replacement of at least a portion of the regular notification information will be superimposed on the video signal. Furthermore, since the relay device 10 can display the simple notification information on the screen 7a of the TV 7, the chance of missing a notification notified by an application can also be reduced when compared to the case in which no information relating to the regular notification information is displayed on the TV 7.

In addition, in the embodiment, for example, the controller 16 may further includes the determiner 16b which determines whether the regular notification information includes personal information. The superimposer 16c may superimpose the simple notification information (second notification information) on the video signal when the regular notification information is determined to include the personal information, and may superimpose the regular notification information (first notification information) on the video signal when the regular notification information is determined not to include the personal information. At this time, the simple notification information need not include the personal information.

Accordingly, it is possible to determine whether the regular notification information includes the personal information, and to change notification information which is to be superimposed on a video signal, based on a determination result. Therefore, the relay device 10 can more assuredly prevent the personal information from being displayed on the screen 7a of the TV 7.

In addition, in the embodiment, for example, the determiner 16b may determine whether the regular notification information includes the personal information by determining whether the regular notification information includes a predetermined keyword. Furthermore, in the embodiment, for example, the determiner 16b may determine whether the regular notification information includes the personal information, based on a source application from which the regular notification information is notified.

Accordingly, the relay device 10 can more accurately determine whether the regular notification information includes the personal information.

In addition, in the embodiment, for example, the simple notification information may include a mark corresponding to a source application from which the regular notification information is notified.

Accordingly, a user of the mobile terminal 6 can identify a source application from which notification information is notified on the screen 7a of the TV 7 without detail of the notification information being known by the other viewers. Afterwards, the user of the mobile terminal 6 can also check the detail of the notification information on the screen 6a of the mobile terminal 6 as necessary. That is to say, the relay device 10 enables the user of the mobile terminal 6 to become aware of a notification notified by the application that is installed on the mobile terminal 6 on the screen 7a of the TV 7, without the personal information being disclosed to the other viewers.

In addition, in the embodiment, for example, the regular notification information may include a content of a message and information about a sender of the message, and the simple notification information may include the information about the sender of the message, and need not include the content of the message. Furthermore, in the embodiment, for example, the simple notification information may further include the number of messages received. Moreover, in the embodiment, for example, the regular notification information may include time of an incoming phone call and information about a caller of the incoming phone call, and, the simple notification information may include information indicating the time of the incoming phone call, and need not include information about the caller of the incoming phone call.

Accordingly, it is possible to prevent the personal information from being displayed on the screen 7a of the TV 7.

In addition, in the embodiment, for example, the first interface 12 may be directly connected with the mobile terminal 6, and need not be connected with the mobile terminal 6 via a cable.

Accordingly, the relay device 10 can be used as the so-called cradle or docking station.

Other Embodiment

The foregoing has described the relay device according to one or more modes based on the embodiments, yet the present disclosure is not limited to the embodiments. Without departing from the scope of the present disclosure, various modifications which may be conceived by a person skilled in the art, and embodiments achieved by combining elements in different embodiments may be encompassed within the scope of the one or more aspects of the present disclosure.

Note that in the embodiment above, the simple notification information includes a mark or a character corresponding to a source application from which notification information is notified, but is not limited to the above. For example, the simple notification information need not correspond to the source application, and the simple notification information may include the same mark or the same character irrespective of the source application. In this case, the user of the mobile terminal 6 cannot distinguish the source application from the simple notification information, but the user can be aware that the mobile terminal 6 is notifying some kind of notification.

In addition, the source application need not be distinguished according to the shape of a mark or a character. The source application may be distinguished according to the color of a mark. For example, a red mark may be used for a phone call app, and a blue mark which has the same shape as the red mark may be used for an SNS app. In addition, the source application may be distinguished according to a display mode. For example, a blinking mode may be used for the phone call app, and a non-blinking mode may be used for the SNS app. In addition, for example, all applications may have a different blinking cycle.

Note that the embodiment above has described that the personal information included in the regular notification information is being deleted, but the personal information included in the regular notification information may be replaced with unidentifiable information by performing image processing, such as mosaic processing, on the regular notification information. That is to say, in the simple notification information, the personal information may be visually concealed.

Note that the embodiment above has described that the controller 16 of the relay device 10 includes the determiner 16b, but the controller 16 need not include the determiner 16b. For example, the relay device 10 may superimpose the simple notification information on a video signal irrespective of whether there is personal information or not. Even in this case, it is possible to prevent the personal information from being displayed, since the simple notification information is displayed on the screen 7a of the TV 7.

In addition, the embodiment above has described that the remocon 5 transmits a command using an infrared radiation, but the remocon 5 may transmits a command using a radio wave, such as Wi-Fi (registered trademark) so long as the command is wirelessly transmitted. In such a case, the third interface 14 may include an antenna, a receiving circuit, or the like to receive the command using a radio wave, such as Wi-Fi (registered trademark).

In addition, the embodiment above has described that the second interface 13 is an interface, such as High-Definition Multimedia interface (HDMI) (registered trademark), which transmits a video signal using a cable, but the second interface 13 may be an interface which wirelessly transmits the video signal using Wi-Fi (registered trademark), for example. In such a case, the second interface 13 may include an antenna, a receiving circuit, or the like to receive the command using a radio wave, such as Wi-Fi (registered trademark).

In addition, the embodiment above has described a case in which a video signal is relayed from the mobile terminal 6 to the TV 7, but an acoustic signal may be relayed together with the video signal. In this case, the TV 7 may have a speaker (not illustrated) which outputs a sound based on the acoustic signal.

In addition, the embodiment above has described a case in which an external display device is a TV, but the external display device is not limited to the TV. For example, the external display device may be a displaying display.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure can be used as a tabletop relay device, such as a cradle for a smartphone or a tablet computer, which relays a video signal that is output from a mobile terminal to a display device.

The invention claimed is:

1. A relay device that relays a video signal from a mobile terminal to an external display device, the relay device comprising:
   a case which holds the mobile terminal, the mobile terminal being attachable to and detachable from the case;
   a first interface to which the mobile terminal held in the case is connected, the first interface being provided on the case;
   a second interface with which the external display device is connected, the second interface being provided on the case; and
   a controller housed in the case, wherein
   the controller includes:
      an obtainer which obtains a video signal and first notification information from the mobile terminal via the first interface; and
      a superimposer which superimposes second notification information on the video signal based on the first notification information, and outputs the video signal on which the second notification information is superimposed to the external display device via the second interface, the second notification information being obtained by at least one of deletion or replacement of at least a portion of the first notification information.

2. The relay device according to claim 1, wherein
the controller further includes a determiner which determines whether the first notification information includes personal information, and
the superimposer superimposes:
   the second notification information on the video signal when the first notification information is determined to include the personal information, the second notification information not including the personal information, and
   the first notification information on the video signal when the first notification information is determined not to include the personal information.

3. The relay device according to claim 2, wherein
the determiner determines whether the first notification information includes the personal information by determining whether the first notification information includes a predetermined keyword.

4. The relay device according to claim 2, wherein
the determiner determines whether the first notification information includes the personal information, based on a source application from which the first notification information is notified.

5. The relay device according to claim 1, wherein
the second notification information includes a mark corresponding to a source application from which the first notification information is notified.

6. The relay device according to claim 5, wherein
the first notification information includes a content of a message and information about a sender of the message, and
the second notification information includes the information about the sender of the message, and does not include the content of the message.

7. The relay device according to claim 6, wherein
the second notification information further includes a total number of messages received.

8. The relay device according to claim 5, wherein
the first notification information includes time of an incoming phone call and information about a caller of the incoming phone call, and
the second notification information includes information indicating the time of the incoming phone call, and does not include information about the caller of the incoming phone call.

9. The relay device according to claim 1, wherein
the first interface is directly connected with the mobile terminal, not via a cable.

* * * * *